No. 716,579. Patented Dec. 23, 1902.
A. N. RANKIN, Dec'd.
A. B. RANKIN, Administrator.
APPARATUS FOR CONSTRUCTING COLD PACKED PIPE JOINTS.
(Application filed Apr. 22, 1902.)
(No Model.) 4 Sheets—Sheet 1.
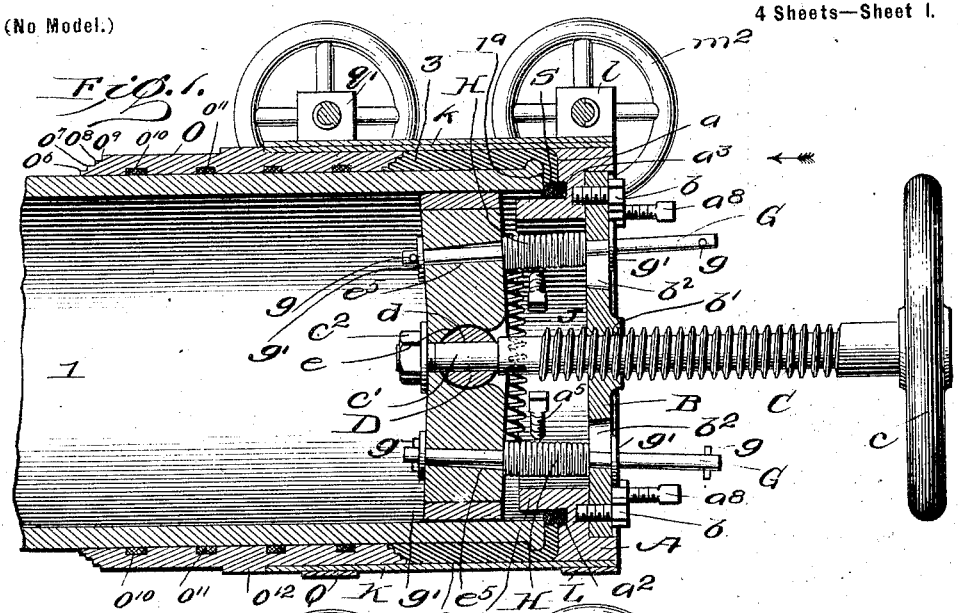
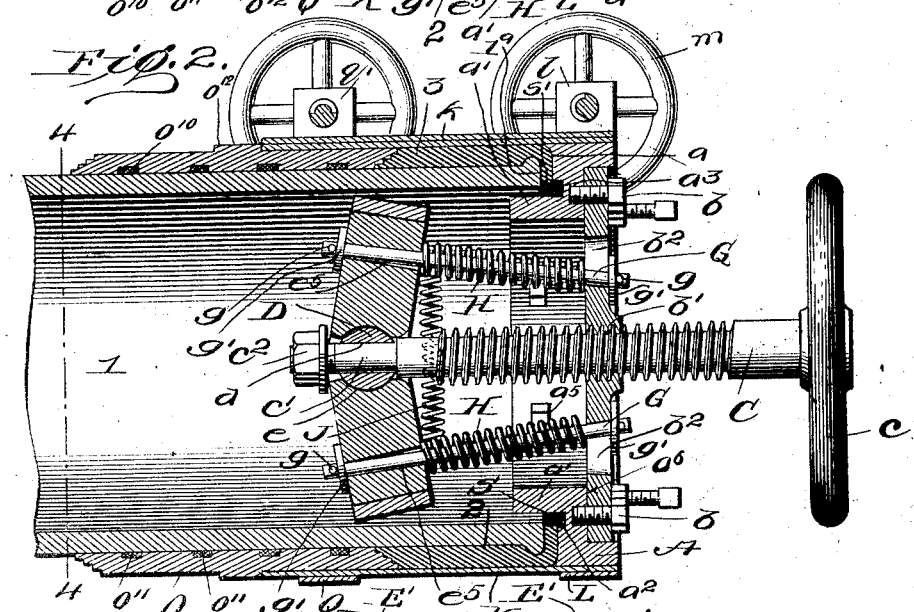
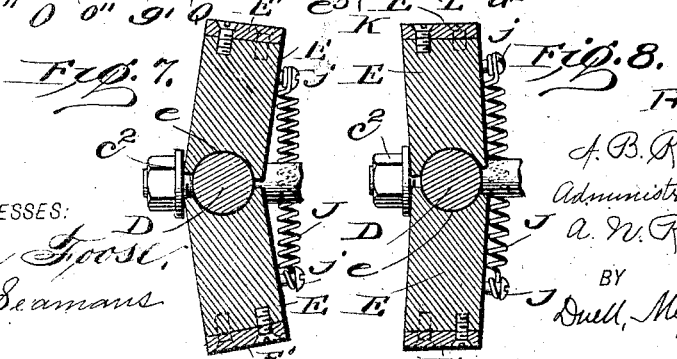
WITNESSES:
Allan Foose,
H. W. Seamans
Inventor
A. B. Rankin,
Administrator Estate of
A. N. Rankin, deceased
BY
Duell, Megrath & Warfield
ATTORNEYS

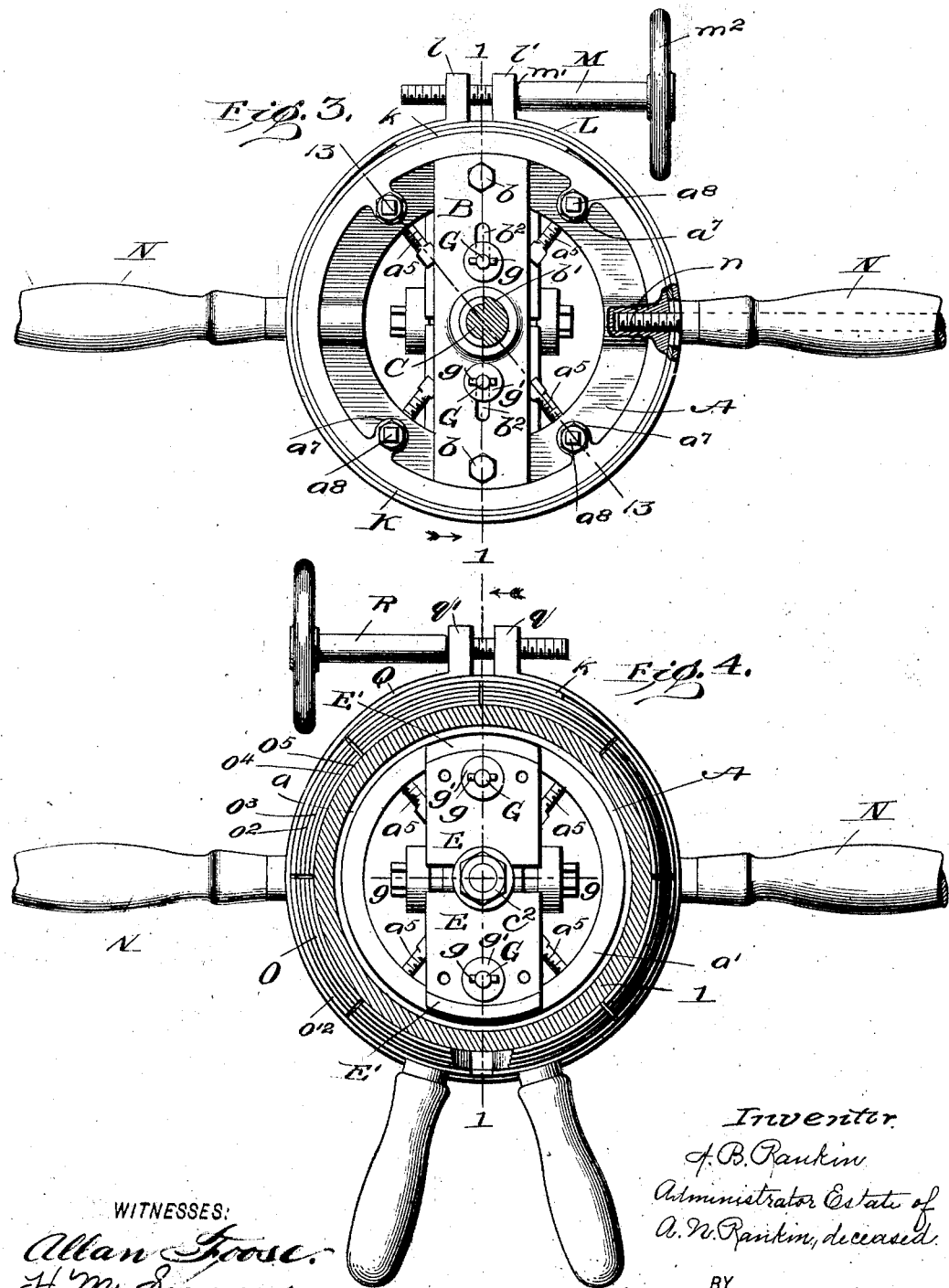

No. 716,579. Patented Dec. 23, 1902.
A. N. RANKIN, Dec'd.
A. B. RANKIN, Administrator.
APPARATUS FOR CONSTRUCTING COLD PACKED PIPE JOINTS.
(Application filed Apr. 22, 1902.)
(No Model.) 4 Sheets—Sheet 3.
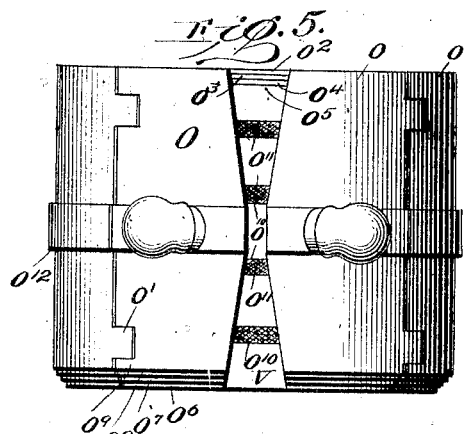
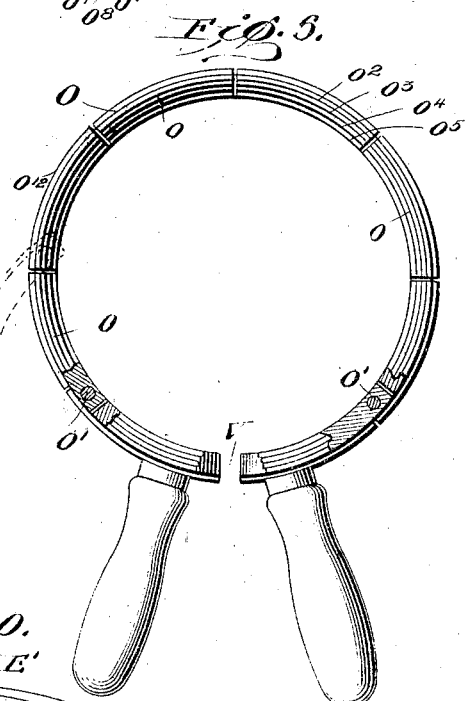
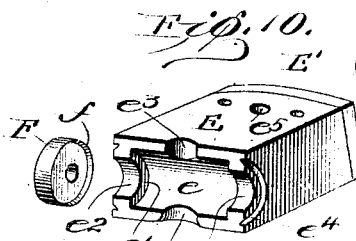
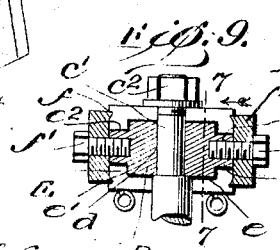
WITNESSES:
Allan Frose.
H. M. Seamans
Inventor
A. B. Rankin,
Administrator Estate of
A. N. Rankin, deceased.
BY
Duell, Megrath Warfield
ATTORNEYS

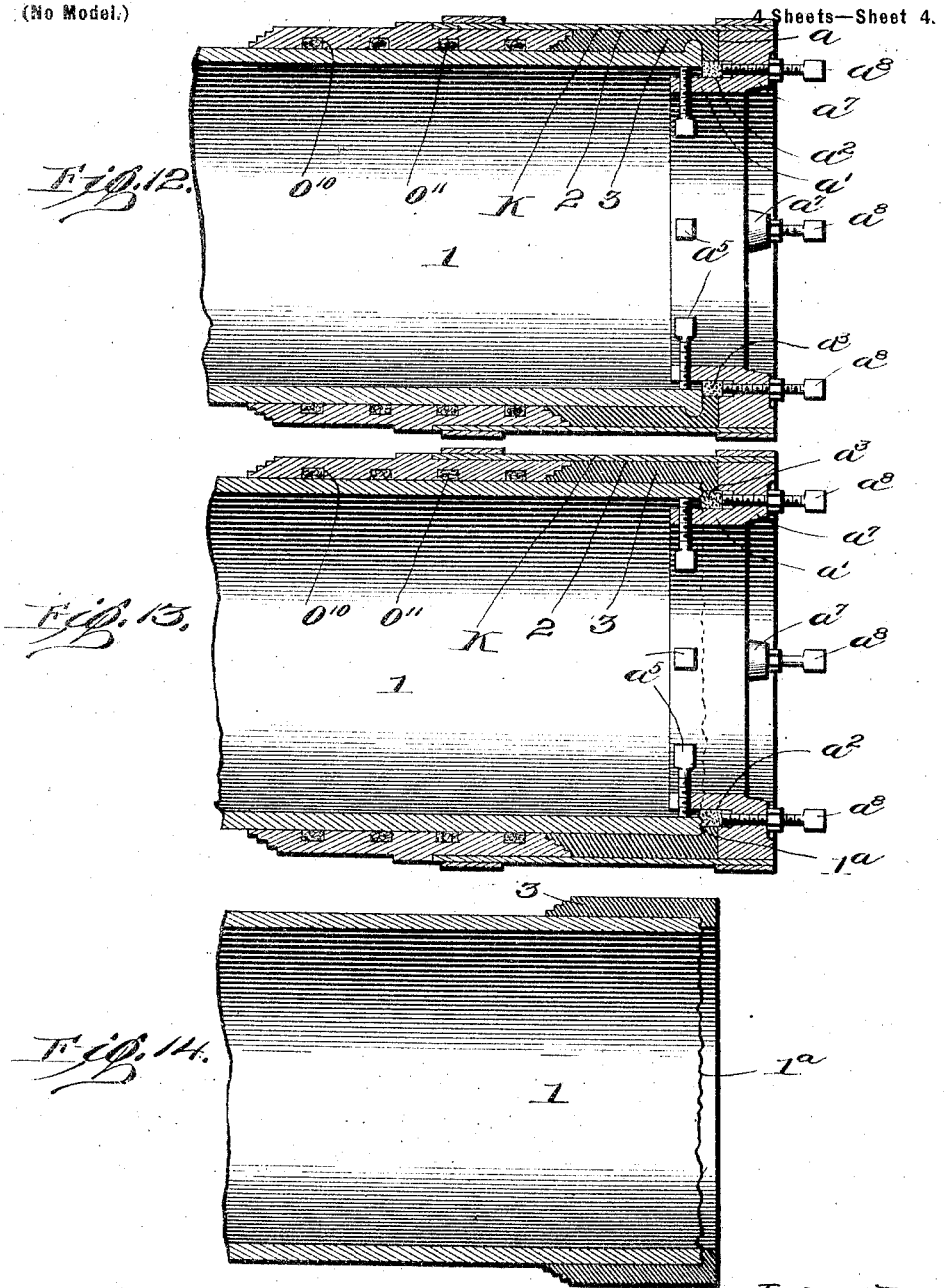

UNITED STATES PATENT OFFICE.

ANDREW BROWN RANKIN, OF BROOKLYN, NEW YORK, ADMINISTRATOR OF ANDREW NERVA RANKIN, DECEASED.

APPARATUS FOR CONSTRUCTING COLD-PACKED PIPE-JOINTS.

SPECIFICATION forming part of Letters Patent No. 716,579, dated December 23, 1902.

Application filed April 22, 1902. Serial No. 104,232. (No model.)

*To all whom it may concern:*

Be it known that ANDREW NERVA RANKIN, deceased, late of Brooklyn, in the county of Kings and State of New York, invented certain new and useful Improvements in Apparatus for Constructing Cold-Packed Pipe-Joints, of which the following is a full, clear, and exact description, such as will enable others skilled in the art to which it appertains to make and use the same.

This invention relates to apparatus for constructing pipe-joints, and is an improvement on the apparatus set forth in prior Letters Patent, No. 419,995, granted on January 21, 1890, to A. N. Rankin. The advantages of an apparatus for constructing cold-packed pipe-joints are fully set forth in that patent and need not be repeated here.

The object of the present invention is to improve the apparatus of the said prior patent and to produce an apparatus that may be quickly, easily, and securely attached to the pipe and when so attached and used will produce a perfect packing.

Another object is to produce an apparatus by which the soft-metal band may be placed on the pipe when the end of the pipe has been cut and left with a ragged or irregular edge and a perfect joint formed with a pipe having such an edge.

Further objects will appear from the following description.

To these ends the invention consists in certain novel construction, combination, and arrangement of parts, all of which will be fully hereinafter set forth in the following description and particularly pointed out by the claims.

Referring to the drawings, which accompany and form a part of this specification, and in which similar parts are indicated by like letters of reference, Figure 1 is a longitudinal section of the spigot end of the pipe with the apparatus for molding the lead band in place, the said apparatus being also shown in section with the clamp-jaws moved to grip the inner face of the pipe, this section being taken on the line 1, Figs. 3 or 4. Fig. 2 is the same section, but in this case the jaws of the clamp are shown as out of contact with the inner face of the pipe. Fig. 3 is an end view of the apparatus looking in the direction of the arrow on Figs. 1 or 2, the hand-wheel by which the screw-rod which operates the gripping-jaws being removed for the purpose of clearly showing the apparatus and the rod being shown in section. Fig. 4 is a section on line 4, Fig. 2, showing the inner face of the clamping or gripping jaws. Fig. 5 is a side elevation of the collar or band used to center the mold on the pipe and which forms one side or end of the mold-chamber. This view shows the open spaces or gates between the ends of the band through which the molten lead is poured into the mold-chamber. Fig. 6 is a view of one edge of this band. Fig. 7 is a sectional view of the clamping-jaws and the pivot on which they are mounted, said section being taken on line 7 of Fig. 9. This view shows the position the jaws assume when they are out of contact with the pipe. Fig. 8 is a section of the same line, but in this figure the jaws are shown in the position they assume when they have been moved to contact with and clamp the inner face of the pipe. Fig. 9 is a section taken on line 9 of Fig. 4 and shows the connection between the clamping-jaws and the end of the screw used to move the said jaws. Fig. 10 is a perspective view of one of the gripping-jaws and one of the washers for holding the jaws in place on the pivot. Fig. 11 is a perspective view of the calking-iron used in connection with the lead band molded on the end of the pipe by this apparatus. Fig. 12 is a longitudinal central section of a piece of pipe, showing means for adjusting the apparatus so that the said apparatus may be centered on the pipe when the diameter of the pipe is slightly greater than the outside diameter of the flange of the apparatus which fits in the inside of the pipe. In this view the gripping-jaws and the means for operating them are omitted for the purpose of clearness. Fig. 13 is a longitudinal central section of a piece of pipe having an irregular or ragged edge and the apparatus attached to such a pipe, so that the band may be cast on such an end of the pipe. As in the prior view, the gripping-jaws and means for operating them are omitted for the purpose of clearness. Fig. 14 is a longitudinal section of the irregular end of the pipe, showing the lead band cast thereon.

On the drawings the part lettered A represents the head-block, which seats against the pipe end. The inner face of the block is recessed at $a$, leaving an annular flange $a'$, which projects a short distance into the pipe when the apparatus is in place.

$a^2$ is a groove surrounding the flange $a'$ and into which is placed packing $a^3$ of asbestos or other suitable material. The flange $a$ has a series of screw-threaded openings therein, through which are inserted the screw-threaded bolts $a^5$. The head-block is also recessed on its outer face, as shown at $a^6$, and has a series of inwardly-projecting lugs $a^7$, having screw-threaded openings therein, into which are inserted the screw-threaded bolts $a^8$.

B is a plate extending across the head-block, fitting in the recessed portion $a^6$ thereof and secured to the head-block by the screw-bolts $b$. $b'$ is a screw-threaded opening in this plate, and $b^2$ is a longitudinal slot on each side of said opening.

C is a screw-threaded rod passing through the screw-threaded opening $b'$. The outer end of this rod has a hand-wheel $c$ attached thereto. The inner end of the rod is reduced, as shown at $c'$, and has screw-threads on this reduced end which receive a nut $c^2$ to hold the gripping-jaws on the rod.

D is a rod to which the gripping-jaws are pivoted. This bolt has a hole $d$ therein, through which the reduced end $c'$ of the screw-rod C passes. The ends of the bolt D are reduced at $d'$, and each end has a screw-threaded opening $d^2$ therein.

E represents the gripping-jaws, having their inner ends shaped to conform to the shape of the bolt D—that is, this end is provided with a longitudinal concave or semicircular recess $e$, there being left on the edges a flanged part $e'$, which fits into the recessed part $d'$ of the bolt D. These flanged parts are also recessed at $e^2$ to conform to the shape of the bolt.

$e^3$ represents vertical recesses in the end of the jaw, into which fits the recessed portion $c'$ of the rod C. The edges of the jaws are grooved at $e^4$ to receive the inwardly-projecting edges or flanges $f$ of the washers F, which hold the jaws in place on the bolt D, these washers being fastened to the ends of the bolt D by bolts $f'$, passing through holes in the center of washers and into the screw-threaded opening $d^2$ in said bolt D.

The outer end of each jaw E may be provided with a separate gripping-plate E', which may be secured to the jaw by screws and which may have its face roughened or serrated in order to more firmly grip the inner face of the pipe. Each of these jaws is provided with a tapered opening $e^5$, through which the inner end of the rod G passes. The other end of the rod passes through the slot $b^2$ in the plate B. Each end of the rod is provided with an opening through which a pin $g$ passes to hold the rod in place.

$g'$ represents washers placed on the ends of the rods between the pins $g$ and the inner faces of the jaws E and the outer face of the plate B. Surrounding each rod is a coiled spring H, the inner end of which rests against the outer face of the jaw E and the other against the inner face of the plate B.

J represents two coil-springs, one on each side of the screw-rod C. Each of these springs is connected at each end to the outer face of the gripping-jaws by screws $j$.

K is the casing which forms the outer surface of the mold-chamber. This casing is connected at its outer edge to the head-block. The ends of the casing overlap, as shown at $k$, to permit the diameter thereof to be increased and diminished, so that the apparatus may be used on pipes of different diameters within certain limits. The casing is held on the head-block by the clamping-band L. The ends of this band have lugs $l$ $l'$ thereon. $l$ has a screw-threaded opening into which is screwed the reduced screw-threaded part of the rod M. The other lug $l'$ has a plain opening therein, through which this reduced portion of the rod M freely passes. The reduced portion forms a shoulder $m'$, which rests against the lug $l'$, so that when the rod M is turned the other lug will be moved toward or from the lug $l$, as desired, thereby contracting or expanding the band in a manner well known. Upon the rod being turned in one direction the ends of the band carrying these lugs are brought closer together and the band contracted and caused to press upon and grip the casing K against the head-block to hold the band thereon. The reverse movement loosens the band.

$m^2$ is a hand-wheel attached to one end of the rod M, by which said rod is turned.

N represents handles by which the head-block is moved and attached. These handles are secured to the head-block by bolts $n$, the casing K and the band L being provided with openings through which the bolts pass, and the inner ends of these bolts are screw-threaded and fit into the screw-threaded openings in the head-block provided for this purpose.

O is the collar which surrounds the pipe and is used to center the head-blocks and the casing on the pipe. This collar consists of sections or links $o$, pivoted together at $o'$. The collar is constructed in this way so that it may be lengthened or reduced by putting in or taking out additional links, so that it may be used on pipes of different diameters. The free end of each end link is inclined from the middle portion outward, so that when the collar is placed around the pipe these inclined parts will form a V-shaped gate or passage V, into which the molten metal is poured and through which it passes to the mold-chamber when a band is cast upon the pipe. Each edge of this collar is provided with graduations or steps, so that corresponding graduations may be formed on the inner edge of the metal band for the purpose of improved calking when the joint is formed between the spigot and bell ends of the sections of pipe. The calking-iron used in connection with the metal band that is made by this apparatus is shown in Fig. 11 of the drawings and is marked P, the graduated parts being marked $p$, $p'$, $p^2$, and $p^3$. One series $o^2$, $o^3$, $o^4$, and $o^5$ of these graduations is provided on the inner face of the collar and will form corresponding graduations on the outer surface of the metal band when this end of the collar is used to form one edge of the mold-chamber. The other series $o^6$, $o^7$, $o^8$, and $o^9$ is formed on the outer surface, and when this edge of the collar is used corresponding steps or projecting lips will be formed on the inner face of the metal band. Either edge of the collar may be used as desired, in some instances it being preferable to form the graduations on the outer surface of the metal band and in other cases on the inner surface. The inner face of the collar is provided with a series of annular grooves $o^{10}$, into which is placed packing $o^{11}$, preferably asbestos. This packing comes in contact with the outer surfaces of the pipe when the collar is used and grips the pipe and prevents the collar from slipping. The outer surfaces of the collar, near the middle thereof, may be provided with an annular projection or rim $o^{12}$, against which the inner edge of the casing K rests. Each of the end links of the collar may have a handle attached thereto by which the collar is manipulated.

Q is another securing-band, constructed the same as the band L, having the lugs $q$ $q'$ on the ends thereof, and the screw R having a reduced screw-threaded end which passes through the lugs $q$ $q'$. This band operates in the same manner as the band L. It is placed around the inner end of the casing K and is used to grip and secure this end of the casing to the collar O.

S is a gasket, preferably made of asbestos and may have a small wire $s'$ in the center thereof. This gasket is placed around the inwardly-projecting flange $a'$ of the head-blocks just over the asbestos packing $a^3$, so as to insure close contact between the head-block and the pipe end to prevent the lead as it is poured into the mold-chamber from running to waste.

The apparatus is applied to the end of the pipe and operated as follows: The head-block carrying the grip-jaws and the casing is placed on the spigot end of the pipe 1 with the edge 1ª of the pipe resting against the gasket S and the gripping-jaws in the pipe, the jaws being out of contact with the pipe, as shown in Fig. 2 of the drawings. The hand-wheel $c$ is now turned to move the screw-rod C out, drawing the clamp-jaws toward the head-block. This movement of the block causes the coil-springs H to contract, which moves the grip-jaws on the hinged bolt $d$, so that the gripping ends or faces of these jaws will be brought into contact with the inner face of the pipe to securely hold the head-block on the end of the pipe. The position of the parts when the screw-rod has been moved to pull the gripping-jaws toward the head-block and to move them so that they will grip the pipe as described is shown in Fig. 1 of the drawings. When the head-block is therefore secured on the end of the pipe, the collar O is then placed upon the pipe with either edge desired projecting into the inner end of the casing K. As shown in Figs. 1 and 2 of the drawings, that edge of the collar for forming the graduations on the outside of the metal band is in the case. In adjusting the collar the gate V is placed uppermost, so that the molten lead can be readily poured into the mold-chamber. The screw R is now turned to cause the band Q to tightly grip the inner end of the casing K against the collar O. This pressure of the securing-band also presses the collar O against the pipe and tightly secures the collar to the pipe, the asbestos packing $o''$, carried by the collar, preventing the collar from slipping on the pipe, as before stated. As the apparatus is thus arranged on the pipe the inner recessed portion $a$ of the head-block forms one end of a mold-chamber 2, the edge of the collar O projecting into the casing K forming the other end. The casing K and the pipe 1 form the sides of this mold-chamber. The mold-chamber is entirely closed, except at the point V, where the collar is beveled, as before stated. When the parts are in place and secured to the pipe, as above described, the molten metal is poured through the gate V into the mold-chamber. The molten lead flows around the sides of the pipe within the mold-chamber and continues to rise in the chamber until it is entirely filled. In running the metal into the mold it may be found advantageous in some instances to form at the entrance of the gate a wall of suitable material, such as clay or the like, to prevent any of the metal from running to waste. As soon as the metal hardens the securing-band Q is loosened and the collar O removed from the pipe. The screw-rod C is then moved in, which forces the pivot-rod D of the gripping-jaws in, so that the jaws will be loosened from the pipe, when the springs J, attached to the jaws, will pull the jaws to the position shown in Fig. 2 of the drawings, moving with them the guide-rods G, carrying the coil-springs H, to the position also shown in said figure, the tapered opening $e^5$ in the jaws and the slots $b^2$ in the plate $b$ permitting the rod G to have the desired movement. When the jaws are thus removed away from the inner surface of the pipe, the head-block carrying these jaws and the casing are removed from the end of the pipe, leaving on the pipe the cast-metal band 3.

It is a well-known fact that the inside diameter of the different makes of pipe are not exactly the same. Pipe made at one place may be of slightly greater diameter than the pipe made at another place. Unless the flanges $a'$ fit snugly within the pipe the apparatus does not center true. Means are provided for centering the apparatus when it is used on a pipe of slightly greater diameter than the diameter of the flange $a'$. This is more clearly shown in Fig. 12 of the drawings. The flange $a'$ is provided with screw-threaded openings into which are inserted the screw-threaded bolts $a^5$. By turning these bolts they can be moved outward, so that the outer ends will fit against the inner surfaces of the pipe, as shown in Fig. 12, for centering the pipe, it being understood, of course, that these bolts are moved at a uniform distance outward. It also happens in the manufacture of pipes that the outer end is irregular. Unless the packing fits closely up against this irregular end the molten metal will run between the pipe and packing and go to waste. To prevent this, the screw-threaded bolts $a^8$ are provided, the inner ends of which rest against the packing $a^3$. When these bolts are screwed inward, they will force the packing close up against the surface of the pipe at all points and prevent the lead from going to waste.

In laying pipe it sometimes becomes necessary to cut off the end of the pipe, and when this is done an irregular or ragged end $1^a$ is formed on the pipe, Figs. 13 and 14. If a metal band is attempted to be formed on this end of the pipe with the apparatus now in use, the molten metal would flow between the end of the pipe and the head-block. To prevent this, the apparatus just described, which consists of the head-block and the screw-threaded bolts $a^8$ and the packing $a^2$, is attached, as shown in Fig. 13. When these screws are forced up against the packing, they press the packing into or against the ragged edge of the pipe, as shown in said figure, forming a tight joint, so that the molten metal when poured into the mold-chamber to form the band will not escape around the irregular edge, but will form a perfect band, as shown in Fig. 14 of the drawings. When the band is formed on the end of the pipe, that end of the pipe is placed into the bell end of the pipe and the soft-metal band is placed down or calked by the tool shown in Fig. 11, thus forming a perfect and tight joint between the sections of the pipe.

It is believed from the above description that the construction and operation of this apparatus will be clearly understood by any one skilled in the art, and no further description is therefore necessary.

While a particular apparatus is shown and described herein, it is to be understood that the invention is not limited to the exact construction herein shown and described, as various modifications or changes may be made without departing from the spirit of the invention.

The invention having now been fully described, what is claimed as new, and desired to be secured by Letters Patent, is—

1. In an apparatus of the class described, a head-block, gripping device carried by said block adapted to grip the inside of a pipe to hold the head-block in place against the edge of the pipe and means for operating said gripping device.

2. In an apparatus of the class described, a head-block, a cross-plate carried by the said head-block, a gripping device also carried by the said head-block and means passing through the cross-plate and adapted to move the gripping device to grip the pipe and hold the head-block against the end thereof.

3. In an apparatus of the class described, a head-block, a plate secured to said head-block, a screw-rod passing through said plate, gripping-jaws pivoted to the inner end of said rod adapted to grip the inner surface of the pipe when the said rod is moved in one direction to hold the head-block against the end of the pipe.

4. In an apparatus of the class described, a head-block having a plate secured thereto, a screw-threaded rod passing through said plate, a gripping device consisting of two jaws pivoted to the end of said plate and adapted when the rod is moved in one direction to grip the inner surface of the pipe to hold the head-block in place against the end of the pipe.

5. In an apparatus of the class described, a head-block having a plate connected thereto, a screw-threaded rod passing through said plate, gripping-jaws pivoted to the inner end of said rod and springs connected to said jaws, the parts so arranged that upon the screw-rod being moved in one direction the gripping-jaws will be moved to grip the inner surface of a pipe to hold the head-block against the end thereof and when moved in another direction to loosen the jaws so that the springs may move the jaws out of contact with the pipe.

6. In an apparatus of the class described, a head-block having a plate secured thereto, said plate having slots therein adapted to receive the end of a rod and also a screw-threaded opening adapted to receive a screw-rod, a screw, gripping-jaws pivoted to the inner end of said screw-rod, said jaws having openings therein, springs connected to said jaws, a rod passing through the openings in the jaws and in the slots in the cross-plate, a spring carried by said rod and resting between the inner face of the plate and the outer face of the gripping-jaws.

7. In an apparatus of the class described, a head-block, means adapted to be moved in contact with the inner surface of a pipe to hold the head-block in contact with the end of the pipe, means for operating said gripping device, a casing carried by said head-block and a collar projecting into the end of the casing and means for gripping the casing and the collar to the pipe as and for the purpose described.

8. In an apparatus of the class described, a head-block, having a groove on the inner surface thereof, a packing in said groove, a gripping device carried by said head-block, adapted to grip the inner end of the pipe and hold it against the packing of the head-block, means for operating said gripping device, a casing secured to the head-block, and surrounding the outer surface of the pipe, a collar surrounding the pipe and projecting into the casing as and for the purposes set forth.

9. In an apparatus of the class described, a head-block having a screw-threaded rod connected thereto, a bolt on the inner end of said rod, gripping-jaws pivoted to said bolt as and for the purpose described.

10. In an apparatus for constructing cold-packed pipe-joints, a head-block, means carried by said head-block whereby a metal collar may be formed on the end of a pipe having a jagged or irregular edge as and for the purposes set forth.

11. In an apparatus of the class described, a head-block, a packing on the inner edge of the head-block, screws passing through said head-block and resting against the packing, the said parts being so adapted and arranged that the metal collar may be formed on the end of the pipe having an irregular or ragged edge.

12. In an apparatus of the class described, a collar consisting of a series of hinged sections or joints and a pin passing vertically through the end of each section by which they are connected together, said collar having an annular groove on the inner face thereof and packing in said groove as and for the purposes set forth.

13. In an apparatus of the class described, a collar consisting of a series of hinged sections, the ends of the sections overlapping and pins passing vertically through said overlapping ends whereby the sections are hinged together, the free end of each section being beveled or inclined to form a gate when the two ends are brought together around a pipe, a series of annular grooves on the inner surface of said collar and packing carried by said grooves as and for the purposes described.

14. In an apparatus for constructing cold-packed pipe-joints, a head-block, and means adapted to center the block on pipes of different internal diameter as and for the purposes described.

15. In an apparatus for constructing cold-packed pipe-joints, a head-block, a gripping device carried by said block adapted to grip the inside of a pipe to hold the head-block in place and means on the head-block for centering the apparatus on pipes of different internal diameters.

16. In an apparatus of the class described, a head-block, packing carried by said block adapted to come in contact with the outer edge of the pipe and means for moving the packing so as to fit close up against a pipe having an irregular edge as and for the purposes set forth.

17. In an apparatus of the class described, a head-block, gripping devices carried by said block adapted to grip the inside of a pipe to hold the head-block in place, packing carried by said head-block and means adapted to adjust the packing against the pipe having an irregular edge as and for the purposes set forth.

18. In an apparatus for constructing cold-packed pipe-joints, a device adapted to be placed against or in proximity to the edge of the pipe, means carried by said device adapted to grip the inside of the pipe to hold said device in place against or in proximity to the edge of the pipe, and means for operating said gripping means.

In testimony whereof I affix my signature in the presence of two witnesses.

ANDREW BROWN RANKIN,
*Administrator of the estate of Andrew Nerva Rankin, deceased.*

Witnesses:
H. M. SEAMANS,
BLANCHE SMITH.